United States Patent  [10] Patent No.: US 7,715,866 B2
Seppinen et al.                (45) Date of Patent:     May 11, 2010

(54) POWER CONTROL (76) Inventors: Pauli Seppinen, Tapparakuja 3 C 2, FI-01700, Vantaa (FI); Risto Kaunisto, Räisäläntie 24 C, FI-02140, Espoo (FI)

( * ) Notice: Subject to any disclaimer, the term of this patent is extended or adjusted under 35 U.S.C. 154(b) by 595 days.

(21) Appl. No.: 11/664,860

(22) PCT Filed: Oct. 12, 2004

(86) PCT No.: PCT/FI2004/000604

§ 371 (c)(1),
(2), (4) Date: Apr. 5, 2007

(87) PCT Pub. No.: WO2006/040388

PCT Pub. Date: Apr. 20, 2006

(65) Prior Publication Data

US 2009/0017859 A1    Jan. 15, 2009

(51) Int. Cl.
*H04B 7/00* (2006.01)
*H04Q 7/20* (2006.01)

(52) U.S. Cl. .................. 455/522; 455/13.4; 455/127.1; 455/67.11; 370/252; 370/318

(58) Field of Classification Search ................. 455/561, 455/186.1, 13.4, 522, 422.1, 24, 452.2, 509, 455/436, 67.11, 67.16, 127.1, 226.1, 68, 455/115.1; 370/335, 318, 320, 332, 333, 370/493, 328, 311, 252, 337, 342, 465
See application file for complete search history.

(56) References Cited

U.S. PATENT DOCUMENTS

| 5,634,195 | A  | * | 5/1997 | Sawyer | 455/522 |
| 6,535,723 | B1 | * | 3/2003 | Jiang et al. | 455/245.1 |
| 6,690,652 | B1 |   | 2/2004 | Sadri | 370/252 |
| 6,904,290 | B1 | * | 6/2005 | Palenius | 455/522 |
| 7,379,478 | B1 | * | 5/2008 | Mantha | 370/493 |
| 2002/0009981 | A1 |   | 1/2002 | Niemla | 455/127 |
| 2002/0021687 | A1 |   | 2/2002 | Toki et al. | 370/345 |
| 2002/0034170 | A1 | * | 3/2002 | Tiedemann et al. | 370/335 |
| 2003/0054851 | A1 |   | 3/2003 | Jo et al. | 455/522 |
| 2005/0255872 | A1 | * | 11/2005 | Lundell et al. | 455/522 |
| 2006/0222916 | A1 | * | 10/2006 | Norimatsu et al. | 429/23 |
| 2007/0191076 | A1 | * | 8/2007 | Hageman et al. | 455/574 |

FOREIGN PATENT DOCUMENTS

WO       WO 03/052968 A1    6/2003

* cited by examiner

*Primary Examiner*—Sujatha Sharma (57) ABSTRACT

The invention relates to a method for controlling output power of a radio transmitter, the radio transmitter operating on a radio channel. The method includes determining requested output power level, and deriving output power, which is to be used, on the basis of a power control algorithm having at least a first and a second power control area, maximum output power of the first area being derived at least on the basis of theoretical minimum attenuation to adjacent receivers, and maximum output power of the second area being derived at least on the basis of actual minimum attenuation to adjacent receivers, wherein an adjacent receiver is a receiver operating on an adjacent channel with respect to the operating channel of said radio transmitter.

23 Claims, 7 Drawing Sheets

POWER CONTROL

FIELD OF THE INVENTION

The invention relates to power control and especially to transmission power control between a mobile device and some other radio network equipment such as a base station.

BACKGROUND OF THE INVENTION

Maximum link range of a mobile device operating in a mobile communication network is strongly dependent on the maximum available output power of such device. Typically, the maximum available output power of mobile device has an effect on the base station density in the network and also on the network's operating expenses and capital expenses.

The maximum output power of a mobile device is dependent on the maximum available DC power, signal waveforms, and minimum possible link distance to adjacent base stations operating on adjacent channels. The minimum distance to the base stations operating on adjacent channels is important because power amplifiers (PA) are non-linear elements and thereby generate so-called adjacent channel power (ACP). RF (Radio Frequency) specifications of systems typically set restrictions to the power that is radiated on the adjacent channels. The reason for setting such restrictions is that ACP interferes with reception of the adjacent base stations if the ACP level is too high.

The restrictions of the specifications are conventionally derived on the basis of the minimum attenuation from the mobile device to the adjacent base stations and on the basis of integrated noise+noise figure over the channel bandwidth. That is, the restrictions are derived on the basis of the worst-case scenario.

Especially in systems, which use signals with high PAPR (Peak-to-Average-Power Ratio), ACPR (Adjacent Channel Power Ratio) requirements of specifications restrict the maximum transmission power level of the mobile devices and PAs of the mobile devices have to continuously operate with high backoff and with very small efficiency in order to maintain sufficient linearity. For example, in OFDM (Orthogonal Frequency Division Multiplexing) PA backoff can be almost 8 dB.

PA backoff is defined as follows: backoff is the ratio of power that is transmitted from the PA to the −1 dB compression point of the PA in dBs.

Because the ACPR requirements are derived on the basis of the worst-case scenario, the whole system is actually operating with low power efficiency and the idle and operation times or ranges of the system remain small.

Typically the upper bound of the output power is determined so that it is possible to implement required TX (transmission) spectrum mask with reasonable power consumption. If the requested output power is less than the available maximum, it is possible to save DC power by tuning for example the supply voltage with DC-DC converters and reducing the output power this way. Current specifications do not allow higher values of ACP than the value derived from the minimum attenuation to receivers operating on adjacent channels. Typically, power control is designed to take into account only in-band power or SINR (Signal-to-Interference and Noise Ratio) requirements.

PAPR reduction techniques can be used for reducing the power amplifier backoff. A technique that is called narrow band or soft clipping reduces probability of high amplitude peaks and in this way reduces the PA backoff one to two dBs. It is possible to clip the signal even more if the required signal quality is not high.

In addition to these measures, there is a need to develop more efficient power control algorithms.

SUMMARY OF THE INVENTION

Now a new power control algorithm has been invented.

One of the basic ideas of the invention is to divide power control algorithm into two areas.

In the first area the requested output power is less than or equal to the maximum output power derived in a conventional way (that is, on the basis of worst-case minimum attenuation to adjacent base stations). There the output power to be used is derived in the conventional way and conventional radiation mask has to be met.

In the second area the requested output power exceeds the maximum output power derived in the conventional way. In this area an extended power control scheme is used. The mobile device measures actual minimum attenuation to the adjacent base stations operating on adjacent channels and derives output power to be used on the basis of the measured minimum attenuation. That is, the output power can be higher than the maximum derived in the conventional way.

According to a first aspect of the invention, there is provided a method for controlling output power of a radio transmitter, the radio transmitter operating on a radio channel, wherein the method comprises:
determining requested output power level, and
deriving output power, which is to be used, on the basis of a power control algorithm having at least a first and a second power control area, maximum output power of the first area being derived at least on the basis of theoretical minimum attenuation to adjacent receivers, and maximum output power of the second area being derived at least on the basis of actual minimum attenuation to adjacent receivers, wherein an adjacent receiver is a receiver operating on an adjacent channel with respect to the operating channel of said radio transmitter.

According to a second aspect of the invention, there is provided a radio communication device comprising a radio transmitter, the radio transmitter operating on a radio channel, wherein the radio transmitter comprises:
processing means,
said processing means being arranged to determine requested output power level, and
said processing means being arranged to derive output power, which is to be used, on the basis of a power control algorithm having at least a first and a second power control area, maximum output power of the first area being derived at least on the basis of theoretical minimum attenuation to adjacent receivers, and maximum output power of the second area being derived at least on the basis of actual minimum attenuation to adjacent receivers, wherein an adjacent receiver is a receiver operating on an adjacent channel with respect to the operating channel of said radio transmitter.

According to a third aspect of the invention, there is provided a transmitter module, the transmitter module operating on a radio channel, wherein the radio transmitter comprises processing means,
said processing means being arranged to determine requested output power level, and
said processing means being arranged to derive output power, which is to be used, on the basis of a power control algorithm having at least a first and a second power control area, maximum output power of the first area being derived at least on the basis of theoretical minimum attenuation to adjacent receivers, and maximum output power of the second area being derived at least on the basis of actual minimum attenuation to adjacent receivers, wherein an adjacent receiver is a receiver operating on an adjacent channel with respect to the operating channel of said radio transmitter.

According to a fourth aspect of the invention, there is provided a system comprising at least a first and a second radio receiver, which operate on adjacent radio channels, and at least one radio transmitter communicating with said first radio receiver on the operating channel of the radio transmitter, wherein said radio transmitter comprises processing means, said processing means being arranged to determine requested output power level, and said processing means being arranged to derive output power, which is to be used, on the basis of a power control algorithm having at least a first and a second power control area, maximum output power of the first area being derived at least on the basis of theoretical minimum attenuation to adjacent receivers, and maximum output power of the second area being derived at least on the basis of actual minimum attenuation to adjacent receivers, wherein an adjacent receiver is a receiver operating on an adjacent channel with respect to the operating channel of said radio transmitter.

According to a fifth aspect of the invention, there is provided a computer program for controlling output power of a radio transmitter, the radio transmitter operating on a radio channel, wherein the computer program comprises:

program code for determining requested output power level, and program code for deriving output power, which is to be used, on the basis of a power control algorithm having at least a first and a second power control area, maximum output power of the first area being derived at least on the basis of theoretical minimum attenuation to adjacent receivers, and maximum output power of the second area being derived at least on the basis of actual minimum attenuation to adjacent receivers, wherein an adjacent receiver is a receiver operating on an adjacent channel with respect to the operating channel of said radio transmitter.

Dependent claims contain some embodiments of the invention. The subject matter contained in dependent claims relating to a particular aspect of the invention is also applicable to other aspects of the invention.

The power control method of the invention suits well for controlling uplink power in mobile communication networks.

The invention provides a possibility to use higher maximum output power with higher efficiency than tolerated by conventional specifications. For example, it is possible to increase efficiency of systems that use multi-carrier signals like OFDM and that thereby have low power efficiency in the mobile transmitter in conventional systems.

By means of some embodiments of the invention it is possible to increase the maximum link distance in the area of low BTS density. That is, in the rural area the base station separation can be increased.

BRIEF DESCRIPTION OF THE DRAWINGS

Embodiments of the invention will now be described by way of example with reference to the accompanying drawings in which.

DETAILED DESCRIPTION

Figure 1A:
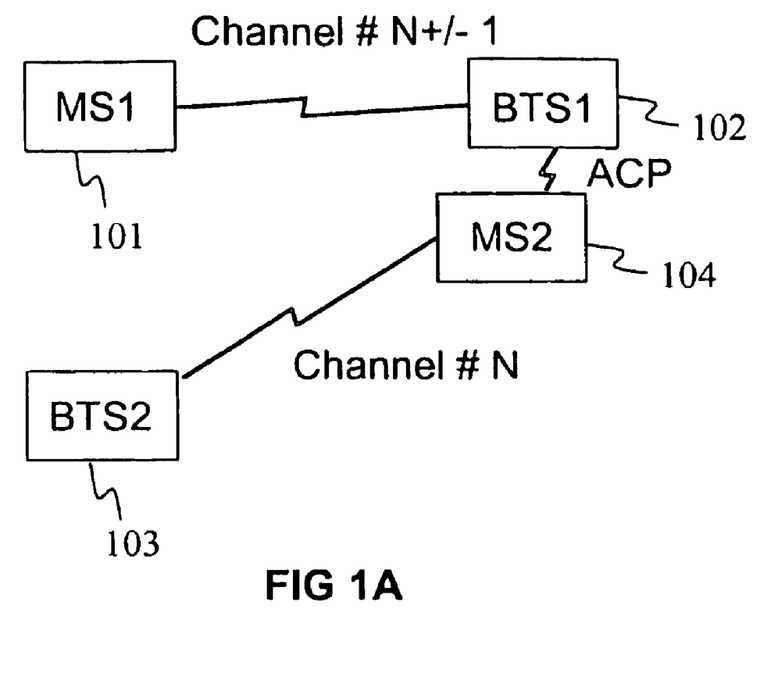
FIGS. 1A and 1B illustrate systems wherein the invention may be employed and a basic idea of the invention.
Figure 1B:
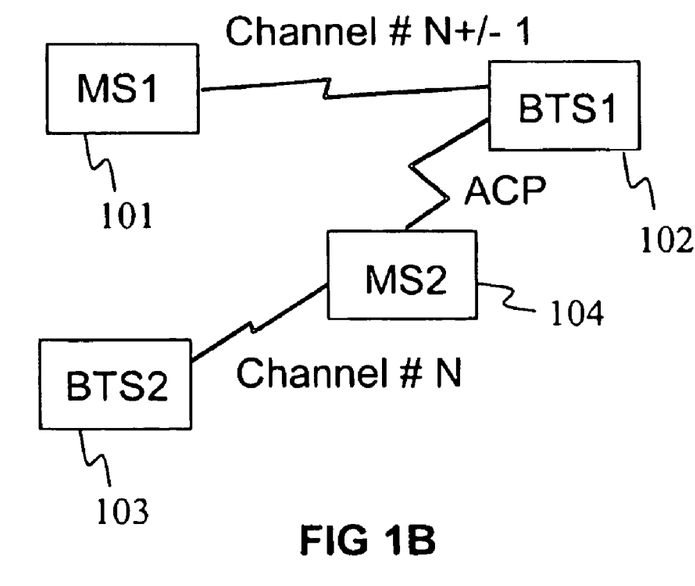

FIGS. 1A and 1B illustrate systems wherein the invention may be employed and a basic idea of the invention. Both Figures comprise a first mobile station (MS1) 101, a second mobile station (MS2) 104, a first base station (BTS1) 102 and a second base station (BTS2) 103. BTS1 and BTS2 operate on adjacent channels. MS2 transmits to BTS2 on channel number N and BTS2 receives signals on channel number N. Correspondingly, MS1 transmits to BTS1 on channel number N+1 (or N−1) and BTS1 receives signals on channel N+1 (or N−1).

In FIG. 1A, MS2 is in proximity of BTS1. The emission mask of the MS2 has to be such that BTS1 is able to receive signals from MS1 even when MS2 is this close to BTS2. That is, ACP of MS2 on channel N+1 (or N−1) may not be so high that it would interfere with the signals of MS1 at BTS1. In conventional power control algorithms this ACP requirement has to be met over the whole area of the system; that is, irrespective of the distance between MS2 and adjacent base stations.

In FIG. 1B, MS2 is located further away from BTS1. Thereby ACP of MS2 on channel N+1 (or N−1) at BTS1 is lower than in the case of FIG. 1A. Thus, ACP of the MS2 transmitter can be increased from the conventional maximum by the amount of the attenuation between MS2 and BTS1. This is one of the basic ideas of the invention. The increase in allowable ACP can be used for increasing efficiency and output power of MS2.

Figure 2:
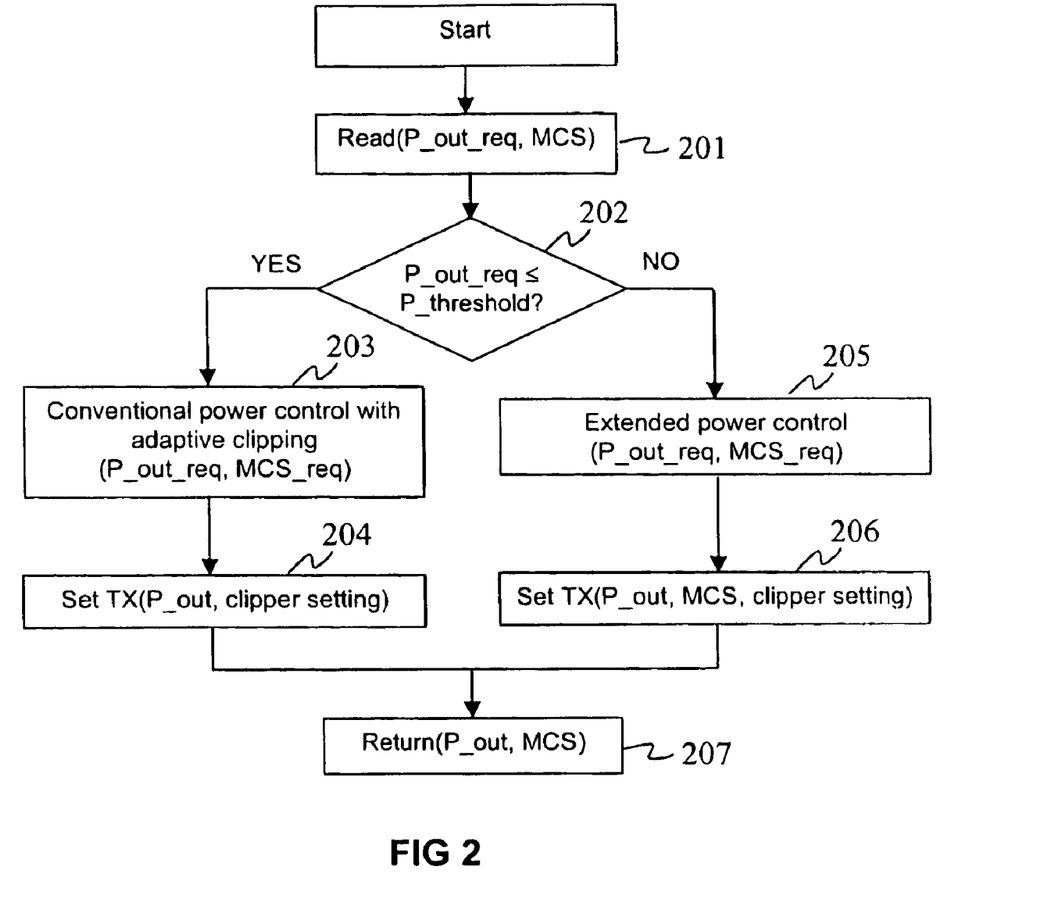
FIG. 2 is a flow diagram illustrating principles of power control according to an embodiment of the invention.

FIG. 2 is a flow diagram illustrating principles of power control according to an embodiment of the invention. In step 201, requested output power P_out_req and requested modulation and coding MCS_req (Modulation and Coding State) are read. P_out_req is obtained from basic uplink power control and MCS is obtained from AMC (Adaptive Modulation and Coding). These are known to persons skilled in the art and thus they need not be discussed any further herein. Further, any suitable method for deriving required uplink power may be used in connection with the invention.

Then requested P_out_req is compared to P_threshold in step 202, wherein P_threshold is maximum output power derived on the basis of theoretical minimum attenuation to adjacent receivers. (That is, P_threshold is the maximum output power used in conventional methods.) If P_out_req is below or equal to P_threshold, output power P_out is derived by means of conventional techniques and the method proceeds to step 203.

In step 203, P_out_req and MCS_req are given as an input to a conventional power control algorithm having adaptive clipping and returning achievable P_out, MCS and clipper setting. In step 204, TX (transmission) state is set in accordance with the output of the conventional power control algorithm by setting P_out and clipper settings.

If P_out_req is found to be higher than P_threshold in step 202, output power P_out is derived by means of an extended power control algorithm and the method proceeds to step 205. In step 205, P_out_req and MCS_req are given as an input to the extended power control algorithm, which returns achievable P_out, MCS and clipper setting. In step 206, TX (transmission) state is set in accordance with the output of the extended power control algorithm by setting P_out, MCS and clipper settings.

Then in step 207, achievable P_out and MCS derived by means of conventional power control algorithm or extended power control algorithm are returned.

Figure 3:
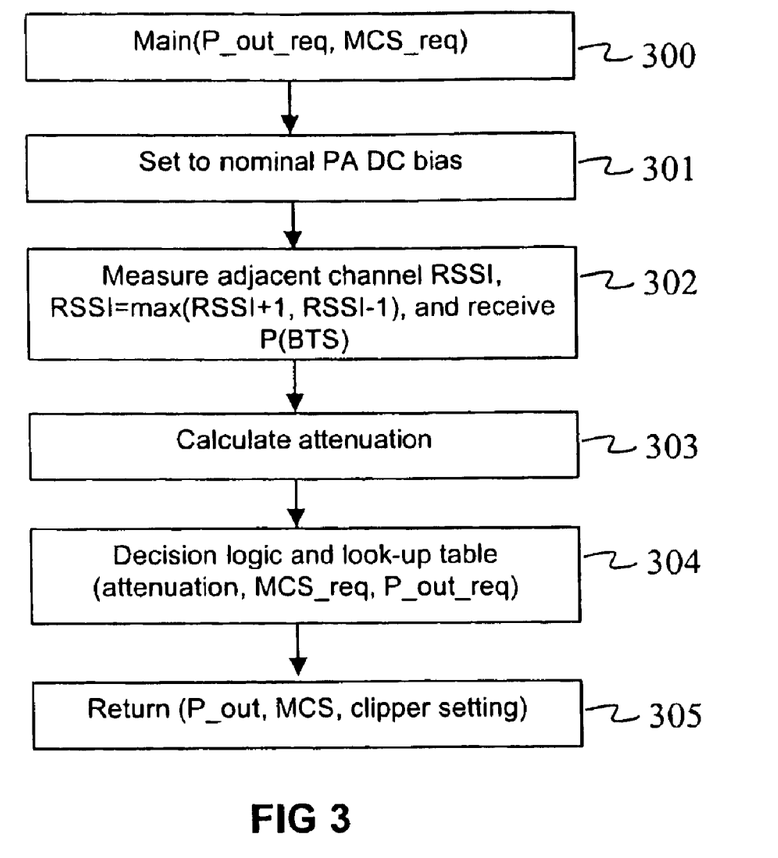
FIG. 3 is a flow diagram illustrating operation of an extended power control algorithm according to an embodiment of the invention.

FIG. 3 is a flow diagram illustrating operation of an extended power control algorithm according to an embodiment of the invention. This is one possible implementation of step 205 in FIG. 2. In step 300, the algorithm receives requested output power P_out_req and requested modulation and coding MCS_req as an input. In step 301, DC bias of the amplifier is set to a nominal value.

Then in step 302, RSSI (Received Signal Strength Indication) on adjacent channels is measured. That is, maximum of RSSI on channels number N+1 and N−1 is measured, wherein N is the number of the channel used by the transmitter. Also the transmission power levels of the base stations P(BTS) operating on the adjacent channels are received. On the basis of these values minimum attenuation between the transmitter and the adjacent base station is calculated in step 303.

In step 304, decision logic and a look-up table are used for deriving achievable P_out, MSC and clipper setting on the basis of the attenuation calculated in step 303, P_out_req and MCS_req. Then in step 305, the algorithm returns achievable P_out, MCS and clipper setting.

Figure 4:
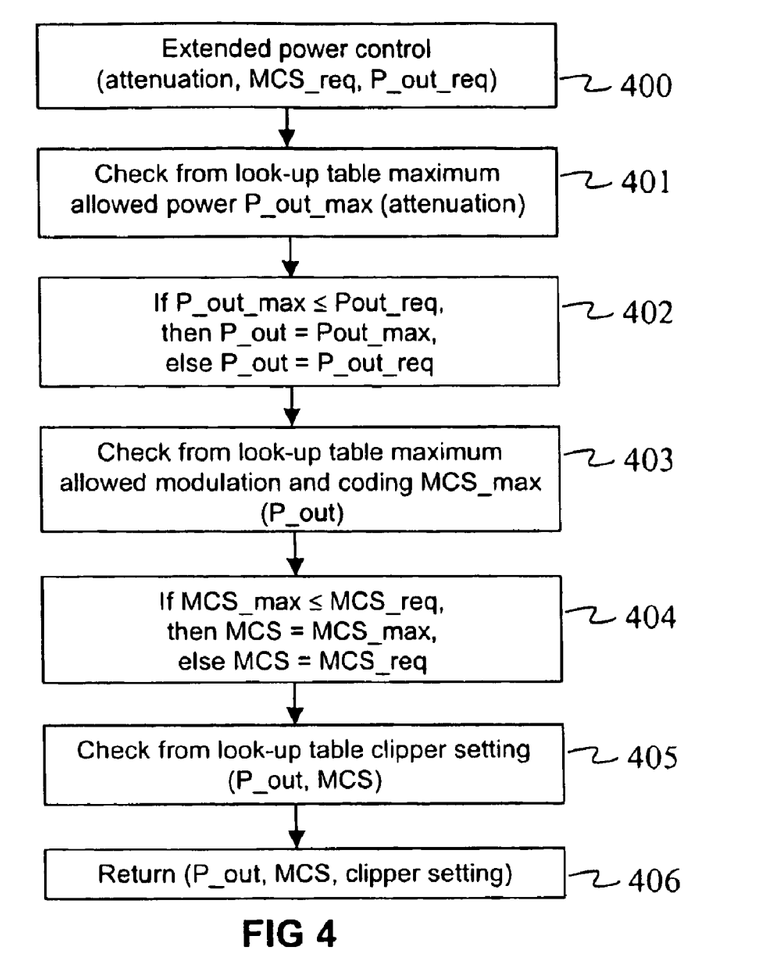
FIG. 4 is a flow diagram illustrating the use of a look-up table in an extended power control algorithm according to an embodiment of the invention.

FIG. 4 is a flow diagram illustrating the use of a look-up table in an extended power control algorithm according to an embodiment of the invention. This is one possible implementation of step 304 in FIG. 3. In step 400, the algorithm receives minimum attenuation between the transmitter and adjacent base stations, requested output power P_out_req and requested modulation and coding MCS_req as an input.

In step 401, maximum allowed output power P_out_max is checked from the look-up table on the basis of the attenuation. If requested output power P_out_req exceeds the maximum allowed output power P_out_max, the value output power P_out is set to value of P_out_max in step 402. Otherwise, the value of output power P_out is set to the value of the requested output power P_out_req in step 402.

In step 403, maximum allowed modulation and coding MCS_max is checked from the look-up table on the basis of P_out. If requested modulation and coding MCS_req exceeds the maximum allowed modulation and coding MCS_max, the value of MCS is set to value of MCS_max in step 404. Otherwise, the value of MCS is set to the value of the MCS_req in step 404.

Then in step 405, clipper setting is checked from the look-up table on the basis of P_out and MCS and in step 406, the algorithm returns achievable P_out, MCS and clipper setting.

Figure 5:
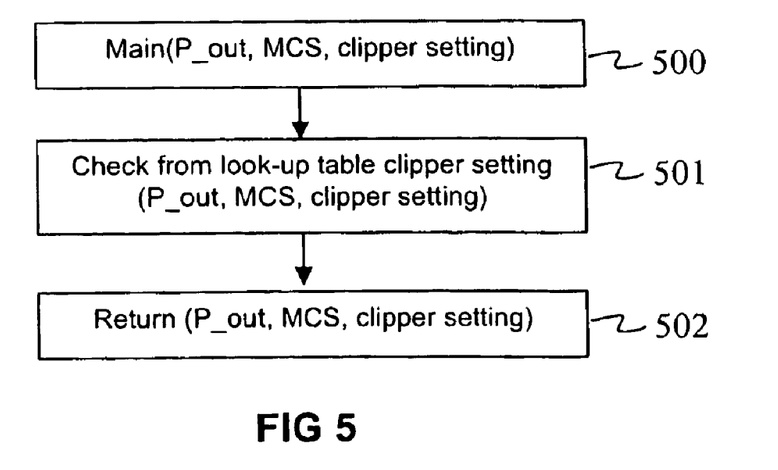
FIG. 5 is a flow diagram illustrating operation of a conventional power control algorithm.

FIG. 5 is a flow diagram illustrating operation of a conventional power control algorithm. This is one possible implementation of step 203 in FIG. 2. In step 500, the algorithm receives requested output power P_out_req and requested modulation and coding MCS_req as an input. In step 501, clipper setting is checked from a look-up table on the basis of P_out_req and MCS_req. Then in step 502, the algorithm returns achievable P_out, MCS and clipper setting.

Figure 6:
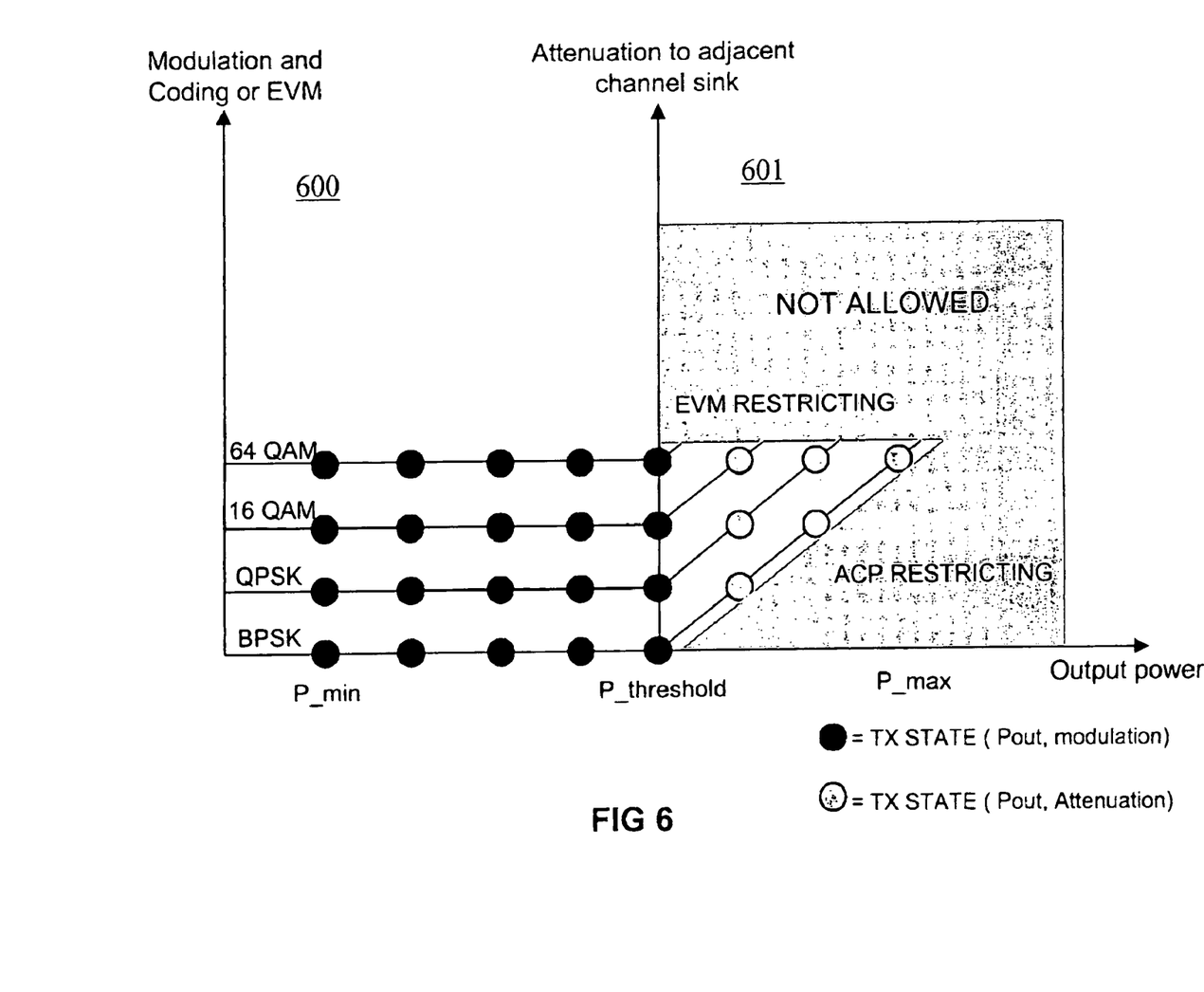
FIG. 6 illustrates a look-up table according to an embodiment of the invention.

FIG. 6 illustrates a look-up table according to an embodiment of the invention. The look-up table is divided into first and second power control areas 600 and 601. The look-up table in the first area 600 corresponds to conventional look-up tables. The look-up table comprises settings (illustrated by black dots) for plurality of TX states as a function of requested power level and modulation and coding state. This look-up table is used when the requested output power level of a mobile transmitter is below or equal to P_threshold, which is maximum output power derived on the basis of theoretical minimum attenuation to adjacent receivers. The look-up table of this first power control area is used for minimizing or reducing used DC power and ACPR. ACPR is reduced by setting soft clipper backoff appropriately.

Figure 7:
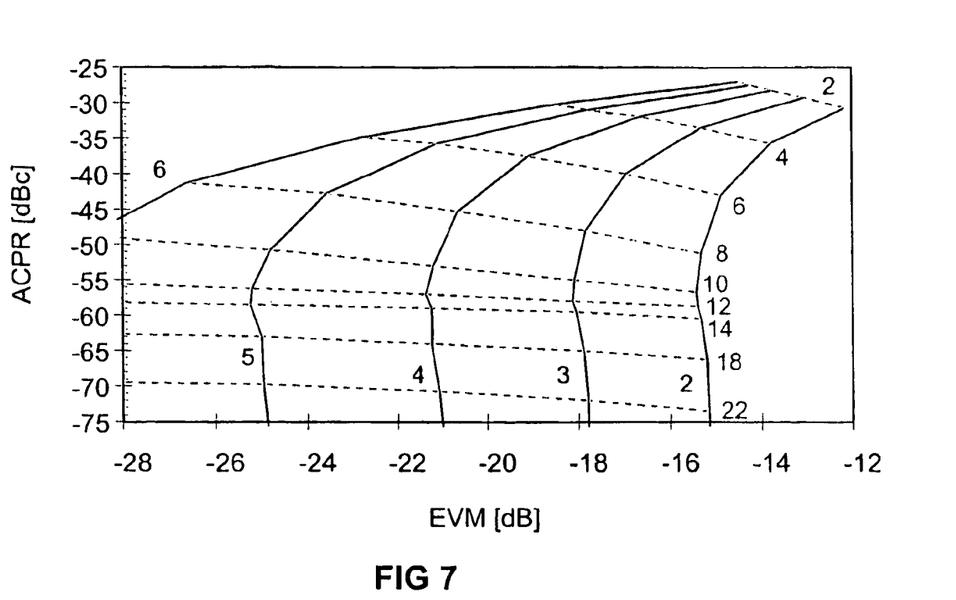
FIG. 7 illustrates backoff of a PA as a function of signal EVM and ACPR.

In other words, in the first power control area conventional power control scheme defines output power and adaptive modulation and coding defines the used modulation and coding combinations. In this area, conventional radiation mask specification has to be met. An adaptive limiting function may be added on top of this conventional power control method. Such adaptive limiting function minimises locally the used DC power. It can be used also for minimizing ACPR. The limiter backoff is adjusted according to the used modulation so that with low order modulations the signal is clipped more than with high order modulations. FIG. 7 below presents as an example the behaviour of the PA as a function of the backoff of the limiter and PA.

The look-up table in the second area 601 is an extended look-up table according to an embodiment of the invention. The look-up table comprises settings (illustrated by grey dots) for plurality of TX states as a function of requested power level and attenuation to adjacent receivers. This look-up table is used when the requested output power level exceeds P_threshold. The look-up table of this second power control area is used for maximizing efficiency of the radio transmitter.

It must be noted that the power control can be arranged to continuously follow the attenuation to the adjacent BTS. The terminal should have possibility to measure the attenuation to the adjacent BTS frequently enough, so that no large errors are generated. The rate of the attenuation measurement can be related to the power control rate of the system and/or attenuation measurement can be set to follow slow fading of the adjacent channel.

One of the targets of the extended power control in addition to the conventional power control scheme is to maximise the power efficiency of a mobile device transmitter in cases, where higher ACP and higher error vector magnitude (EVM) are allowable. As is known to persons skilled in the art, ACP is dominating the PA backoff when low order modulation is used and if high order modulation like 64 QAM is used the required in-band EVM restricts the PA backoff. Thus, in cases where actual ACP and EVM requirements are not as strict as conventional requirements, transmitter efficiency can be increased.

The fact that the requested output power level exceeds P_threshold in the second power control area means that the requested output power is higher than the power, which is achievable in conventional techniques with reasonable DC power consumption and with a typical power amplifier. In the second power control area the mobile transmitter measures attenuation to the closest BTS operating on an adjacent channel and calculates, on the basis of this value, the maximum allowed ACP at the mobile transmitter. If the maximum allowed attenuation is the same or smaller than conventional maximum defined for the threshold power (nominal power), the device does not increase the output power. If the maximum allowed ACP is higher than the conventional maximum ACP, the output power can be increased.

Increase of output power in the second power control area means that also the radiated ACP is increased. Because of this difference, radiation mask for the second power control area may be required to be specified for each extra power step separately. Also because of smaller backoff of the PA the EVM is higher and thus it may not be possible to use all the higher order modulations any more. On the basis of this, look-up table points can be defined for each extra power level and attenuation to the adjacent channel BTS with associated allowed modulations and clipping levels.

If the adaptive modulation and coding requests modulation, for which it is not possible to use the requested output power, the extended power control algorithm may inform the physical layer functionalities that lower order modulation should be used. This way it is possible to operate with small PA backoff without interfering adjacent channel operation. This method will increase the maximum link distance in the area of low BTS density. Additionally, the method allows an increase in the maximum output power without increasing the DC power consumption of the mobile transmitter.

The design of the PA should be such that transmitter can meet the conventional radiation mask requirements with nominal DC power consumption. If the requested output power is less than the threshold power, the DC power consumption can be reduced. Also when the requested output power is higher than the threshold power the DC power consumption should be kept at the nominal level, but efficiency of the transmitter can be increased in that case. Nevertheless, the radiation masks defined for the power levels exceeding the threshold power should be met. Following table presents an example of possible transmitter emission mask for RF specifications.

| P_out | MCS | EVM requirements | ACP, dBm | Attenuation, dB | TX noise floor |
|---|---|---|---|---|---|
| P_min – P_thres | MCS1-MCS9 | −25 dB--−5 dB | ACP spec | Min SA (Specified Attenuation) | PTX noise floor |
| P_thres + 2 dB | MCS3-MCS9 | −19 dB--−5 dB | ACP spec + 6 | SA + 6 | PTX noise floor |
| P_thres + 4 dB | MCS5-MCS9 | −16 dB--−5 dB | ACP spec + 12 | SA + 12 | PTX noise floor |
| P_thers + 6 dB | MCS7-MCS9 | −10 dB--−5 dB | ACP spec + 18 | SA + 18 | PTX noise floor |
| P_thers + 8 dB | MCS9 | −5 dB | ACP spec + 24 | SA + 24 | PTX noise floor |

FIG. 7 illustrates backoff of a PA as a function of signal EVM and ACPR for multi-carrier signals having more than ten sub-carriers. In other words FIG. 7 illustrates simulation of the operation of a PA in the first power control area of an embodiment of the invention. Black curves represent different soft-clipper backoffs and grey, dashed curves represent different PA backoffs.

Curves are shown for soft-clipper backoffs of 2 dB, 3 dB, 4 dB, 5 dB and 6 dB, the leftmost curve representing soft-clipper backoff of 6 dB and the rightmost curve representing soft-clipper backoff of 2 dB. With regard to PA backoff, curves are shown for PA backoffs of 2 dB, 4 dB, 6 dB, 8 dB, 10 dB, 12 dB, 14 dB, 18 dB and 22 dB, the uppermost curve representing PA backoff of 2 dB and the lowermost curve representing PA backoff of 22 dB.

Figure 8:
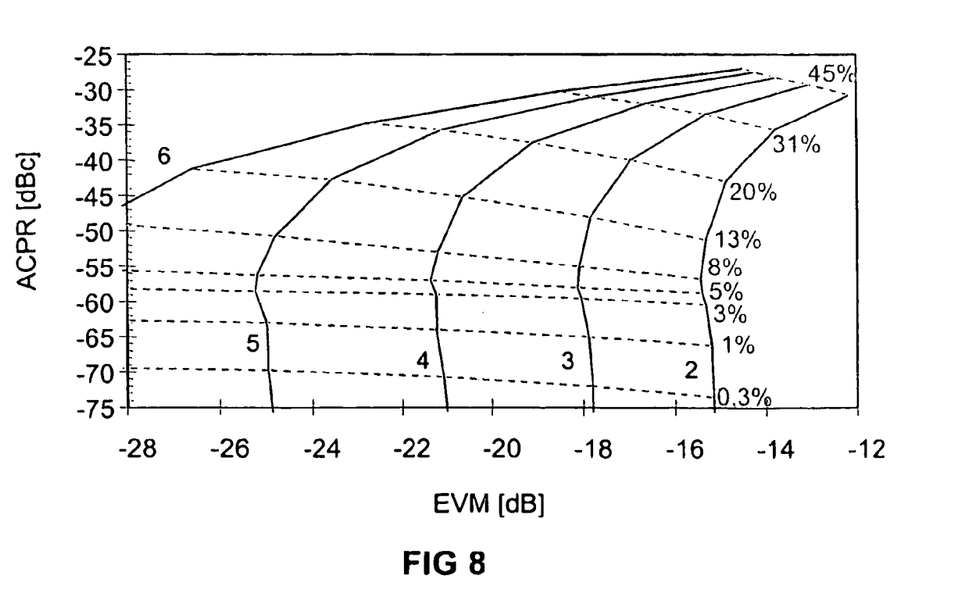
FIG. 8 illustrates efficiency of a PA as a function of signal EVM and ACPR.

FIG. 8 illustrates efficiency of a PA as a function of signal EVM and ACPR for multi-carrier signals having more than ten sub-carriers and for a class AB PA. In other words FIG. 8 illustrates simulation of the operation of a PA in the second power control area of an embodiment of the invention. Black curves represent different soft-clipper backoffs and grey, dashed curves represent different PA efficiency figures.

Also herein, curves are shown for soft-clipper backoffs of 2 dB, 3 dB, 4 dB, 5 dB and 6 dB, the leftmost curve representing soft-clipper backoff of 6 dB and the rightmost curve representing soft-clipper backoff of 2 dB. With regard to PA efficiency, curves are shown for PA efficiency figures of 45%, 31%, 20%, 13%, 8%, 5%, 3%, 1% and 0.3% dB, the uppermost curve representing PA efficiency of 45% and the lowermost curve representing PA efficiency of 0.3%.

The invention can be employed in systems that use synchronised TDD (Time Division Duplex), FDD (Frequency Division Duplex), or FDD/TDD hybrid. The measurement of the attenuation between a mobile device and adjacent BTSs is more accurate if TDD is used because in TDD uplink and downlink channels are at the same frequency. In the case of FDD the attenuation measurement might not be as accurate because uplink and downlink channels are at different frequencies. The accuracy can, however, be improved with longer time averaging of the attenuation measurement and with some safety margins. In FDD system, it is also possible to arrange attenuation measurements so that the mobile device sends a measurement request to the BTSs operating on the adjacent channels and the BTSs send to the mobile device information about the received power level, which is then used for attenuation calculations at the mobile device. In systems that use OFDM, a BTS transmits a training sequence (TS) in the beginning of each downlink MAC frame. By measuring the power of the TS at the mobile device it is possible to calculate the attenuation if the transmission power of the TS is known. If the transmission power is not known, the mobile device can find it out by synchronizing to the channel and decoding the broadcast information, which has to include the BTS transmission power.

The invention may be implemented for example by means of a suitable combination of hardware and software components.

Figure 9:
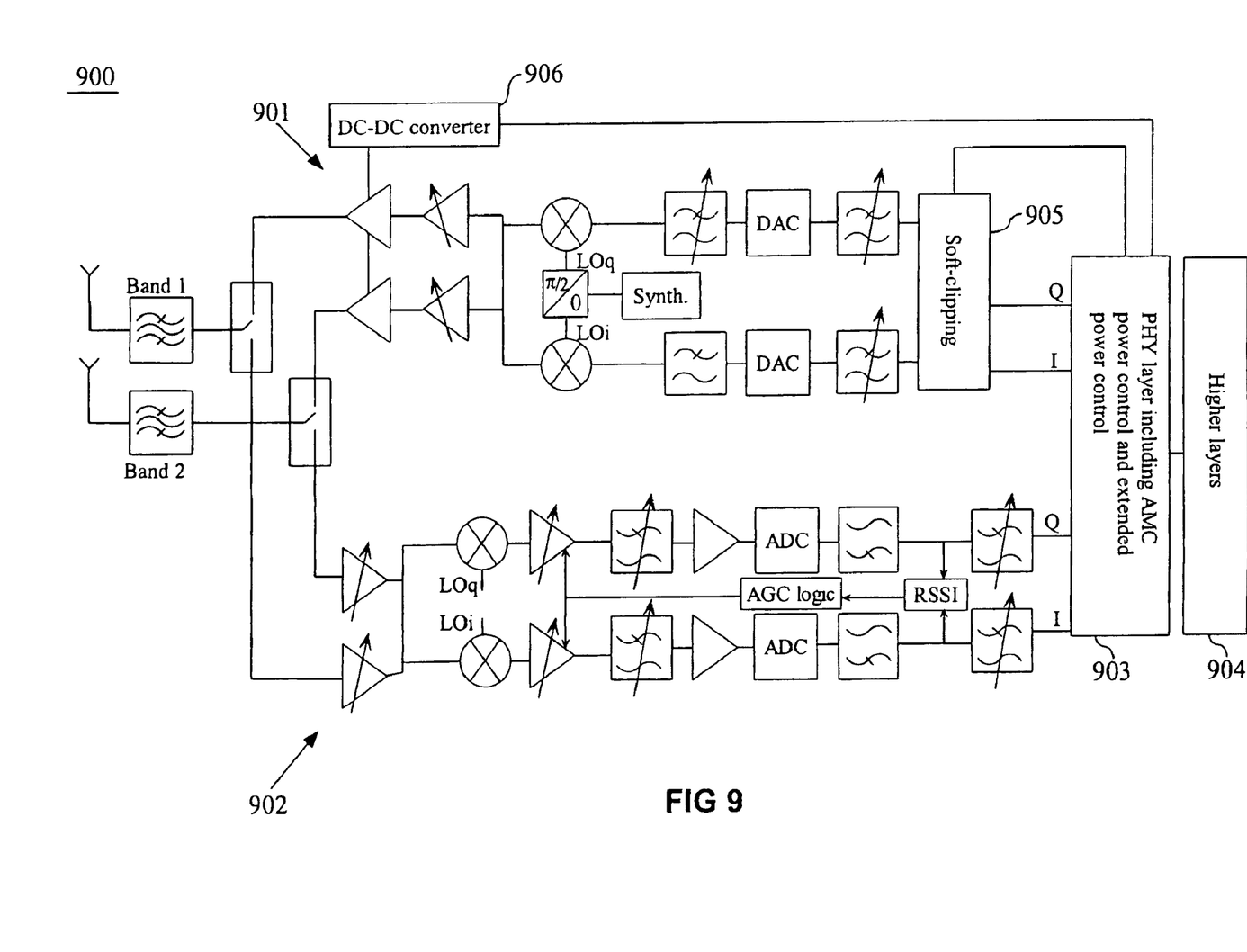
FIG. 9 illustrates schematically a transceiver implementation according to an embodiment of the invention.

FIG. 9 illustrates schematically a transceiver implementation 900 according to an embodiment of the invention. The transceiver may be for example a part of a radio communication device or it may be produced as a separate transceiver module.

The transceiver 900 comprises a transmit branch 901 and a receive branch 902, which are connected to power control module 903. The power control module 903 comprises physical layer functionalities including AMC power control and extended power control and controls transmission power level by means of soft clipping module 905 and DC-DC converter 906. The power control module 903 is also connected to higher layer modules 904.

It must be noted that the implementation of FIG. 9 is only an example and that various other implementations are possible as is obvious to persons skilled in the art.

Figure 10:
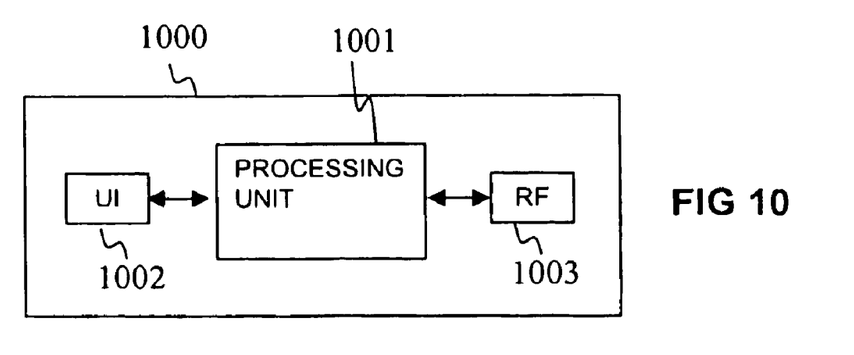
FIG. 10 shows a block diagram illustrating a device according to an embodiment of the invention.

FIG. 10 shows a block diagram illustrating a radio communication device 1000 according to an embodiment of the invention. Such device may be for example a mobile terminal, PDA or some other device comprising communication capabilities.

The device 1000 comprises a processing unit 1001 and a user interface module 1002 coupled to the processing unit 1001. The user of the device may give commands through the user interface module 1002. The processing unit 1001 is coupled to an RF (radio frequency) module 1003 as well. The RF module may comprise for example the transceiver shown in FIG. 9.

The processing unit controls, in accordance with software stored in the radio transmission device, the RF module to provide transmission power control algorithm, wherein output power to be used is derived on the basis of a power control algorithm having at least a first and a second power control area according to the invention.

Particular implementations and embodiments of the invention have been described. It is clear to a person skilled in the art that the invention is not restricted to details of the embodiments presented above, but that it can be implemented in other embodiments using equivalent means without deviating from the characteristics of the invention. The scope of the invention is only restricted by the attached, patent claims.

The invention claimed is:

1. A method for controlling output power of a radio transmitter, the radio transmitter operating on a radio channel, wherein the method comprises:
   determining requested output power level, and
   deriving output power, which is to be used, on the basis of a power control algorithm having at least a first and a second power control area, maximum output power of the first area being derived at least on the basis of theoretical minimum attenuation to adjacent receivers, and maximum output power of the second area being derived at least on the basis of actual minimum attenuation to adjacent receivers, wherein an adjacent receiver is a receiver operating on an adjacent channel with respect to the operating channel of said radio transmitter.

2. A method of claim 1, wherein the method further comprises:
   using said first power control area, when the requested output power level is equal to or below the maximum output power of the first area.

3. A method of claim 1, wherein the method further comprises:
   using said second power control area, when the requested output power level exceeds the maximum output power of the first area.

4. A method of claim 1, wherein the method further comprises:
   minimizing used DC power and/or ACPR (Adjacent Channel Power Ratio) in the first power control area.

5. A method of claim 1, wherein the method further comprises:
   maximizing efficiency of the radio transmitter in the second power control area.

6. A method of claim 1, wherein the method further comprises:
   increasing the output power from the maximum output power of the first area, when using said second power control area.

7. A method of claim 1, wherein the method further comprises:
   using said maximum output power of the first area as a minimum output power of the second area.

8. A method according to claim 1, wherein said actual minimum attenuation to adjacent receivers is derived by
   receiving signals sent by adjacent receivers,
   measuring power levels of the signals received from adjacent receivers,
   determining said actual minimum attenuation to adjacent receivers on the basis of the received power levels and power levels transmitted by the adjacent receivers.

9. A method according to claim 1, further comprising separately specifying radiation mask for each extra power step in the second power control area.

10. A method according to claim 1, further comprising
    receiving a request for certain modulation, and
    if it is not possible to use the derived output power for the requested modulation, informing physical layer functionalities that lower order modulation should be used.

11. A radio communication device comprising a radio transmitter, the radio transmitter operating on a radio channel, wherein the radio communication device comprises:
    processing means, and wherein
    said processing means are arranged to determine requested output power level, and
    said processing means are arranged to derive output power, which is to be used, on the basis of a power control algorithm having at least a first and a second power control area, maximum output power of the first area being derived at least on the basis of theoretical minimum attenuation to adjacent receivers, and maximum output power of the second area being derived at least on the basis of actual minimum attenuation to adjacent receivers, wherein an adjacent receiver is a receiver operating on an adjacent channel with respect to the operating channel of said radio transmitter.

12. A transmitter module, the transmitter module operating on a radio channel, wherein the radio transmitter comprises
    processing means, and wherein
    said processing means are arranged to determine requested output power level, and
    said processing means are arranged to derive output power, which is to be used, on the basis of a power control algorithm having at least a first and a second power control area, maximum output power of the first area being derived at least on the basis of theoretical minimum attenuation to adjacent receivers, and maximum output power of the second area being derived at least on the basis of actual minimum attenuation to adjacent receivers, wherein an adjacent receiver is a receiver operating on an adjacent channel with respect to the operating channel of said radio transmitter.

13. A system comprising
    at least a first and a second radio receiver, which operate on adjacent radio channels, and
    at least one radio transmitter communicating with said first radio receiver on the operating channel of the radio transmitter, wherein said radio transmitter comprises
    processing means, wherein
    said processing means are arranged to determine requested output power level, and
    said processing means are arranged to derive output power, which is to be used, on the basis of a power control algorithm having at least a first and a second power control area, maximum output power of the first area being derived at least on the basis of theoretical minimum attenuation to adjacent receivers, and maximum output power of the second area being derived at least on the basis of actual minimum attenuation to adjacent receivers, wherein an adjacent receiver is a receiver operating on an adjacent channel with respect to the operating channel of said radio transmitter.

14. A memory medium comprising a computer program for controlling output power of a radio transmitter, the radio transmitter operating on a radio channel, wherein the computer program comprises:

program code for determining requested output power level, and program code for deriving output power, which is to be used, on the basis of a power control algorithm having at least a first and a second power control area, maximum output power of the first area being derived at least on the basis of theoretical minimum attenuation to adjacent receivers, and maximum output power of the second area being derived at least on the basis of actual minimum attenuation to adjacent receivers, wherein an adjacent receiver is a receiver operating on an adjacent channel with respect to the operating channel of said radio transmitter.

15. A radio communication device of claim 11, wherein the processing means are arranged to:

use said first power control area, when the requested output power level is equal to or below the maximum output power of the first area.

16. A radio communication device of claim 11, wherein the processing means are arranged to:

use said second power control area, when the requested output power level exceeds the maximum output power of the first area.

17. A radio communication device of claim 11, wherein the processing means are arranged to:

minimize used DC power and/or ACPR (Adjacent Channel Power Ratio) in the first power control area.

18. A radio communication device of claim 11, wherein the processing means are arranged to:

maximize efficiency of the radio transmitter in the second power control area.

19. A radio communication device of claim 11, wherein the processing means are arranged to:

increase the output power from the maximum output power of the first area, when using said second power control area.

20. A radio communication device of claim 11, wherein the processing means are arranged to:

use said maximum output power of the first area as a minimum output power of the second area.

21. A radio communication device according to claim 11, wherein the radio communication device is arranged to receive signals sent by adjacent receivers, measure power levels of the signals received from adjacent receivers, determine said actual minimum attenuation to adjacent receivers on the basis of the received power levels and power levels transmitted by the adjacent receivers.

22. A radio communication device according to claim 11, wherein the radio communication device is arranged to separately specify radiation mask for each extra power step in the second power control area.

23. A radio communication device according to claim 11, wherein the radio communication device is arranged to receive a request for certain modulation, and if it is not possible to use the derived output power for the requested modulation, to inform physical layer functionalities that lower order modulation should be used.

* * * * *